(12) United States Patent
Fritze

(10) Patent No.: US 7,708,148 B2
(45) Date of Patent: May 4, 2010

(54) FREEZE RESISTANT WATER FILTER

(75) Inventor: Karl Fritze, Denmark Township, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/758,841

(22) Filed: Jun. 6, 2007

(65) Prior Publication Data

US 2007/0278148 A1 Dec. 6, 2007

Related U.S. Application Data

(63) Continuation of application No. 10/377,022, filed on Feb. 28, 2003, now abandoned.

(60) Provisional application No. 60/427,770, filed on Nov. 20, 2002.

(51) Int. Cl.
*B01D 27/08* (2006.01)
(52) U.S. Cl. .................. 210/435; 210/440; 210/441
(58) Field of Classification Search ................ 210/435, 210/440, 441
See application file for complete search history.

(56) References Cited

U.S. PATENT DOCUMENTS

| | | | |
|---|---|---|---|
| 3,048,537 A * | 8/1962 | Pall et al. | .............. 210/510.1 |
| 3,701,433 A * | 10/1972 | Krakauer et al. | ............. 210/436 |
| 4,215,726 A * | 8/1980 | Tagami | .................. 138/30 |
| 4,540,489 A | 9/1985 | Barnard | |
| 4,651,781 A | 3/1987 | Kandelman | |
| 4,842,737 A * | 6/1989 | Reed | .................. 210/321.87 |
| 5,045,197 A | 9/1991 | Burrows | |
| 5,256,285 A | 10/1993 | Tomita et al. | |
| 5,273,649 A | 12/1993 | Magnusson et al. | |
| 5,282,966 A | 2/1994 | Walker | |
| 5,462,675 A | 10/1995 | Hopkins et al. | |
| 5,707,518 A | 1/1998 | Coates et al. | |
| 5,715,699 A | 2/1998 | Coates et al. | |
| 5,753,107 A | 5/1998 | Magnusson et al. | |
| 5,907,958 A | 6/1999 | Coates et al. | |
| 5,919,362 A * | 7/1999 | Barnes et al. | ............... 210/232 |
| 5,973,071 A * | 10/1999 | Modic | ................... 525/96 |
| 5,989,424 A | 11/1999 | Serenko et al. | |
| 6,027,644 A | 2/2000 | Magnusson et al. | |
| 6,139,738 A | 10/2000 | Maxwell | |
| 6,193,884 B1 | 2/2001 | Magnusson et al. | |
| 6,296,765 B1 | 10/2001 | Brown et al. | |

(Continued)

FOREIGN PATENT DOCUMENTS

DE 2121533 A1 12/1972

(Continued)

*Primary Examiner*—Terry K Cecil
(74) *Attorney, Agent, or Firm*—Aleksander Medved

(57) ABSTRACT

A freeze resistant filter cartridge assembly, includes a filter cartridge including a filter housing and a filter media and having at least one component selected from a list of components including: the filter housing being formed of an increased elasticity polyolefin polymer having elongation and glass transition properties that allow for stretching of the housing during a freezing event rather than rupturing; a sleeve having a volume of air entrapped therein within and being disposed in the interior of the filter cartridge; and the filter housing formed of a conventional polyolefin having a wall thickness great enough to resist freeze induced expansion stresses. A method of forming a freeze resistant filter cartridge assembly is further included.

12 Claims, 14 Drawing Sheets

U.S. PATENT DOCUMENTS

| | | |
|---|---|---|
| D455,814 S | 4/2002 | Magnusson et al. |
| 6,387,259 B1 | 5/2002 | Roll |
| 6,428,700 B1 | 8/2002 | Brown et al. |
| 6,468,435 B1 * | 10/2002 | Hughes et al. .............. 210/767 |
| 6,632,355 B2 | 10/2003 | Fritze |
| 6,649,056 B2 | 11/2003 | Fritze |
| 2003/0019819 A1 | 1/2003 | Fritze |
| 2003/0146143 A1 | 8/2003 | Roll et al. |

FOREIGN PATENT DOCUMENTS

| | | |
|---|---|---|
| JP | 10137740 A * | 5/1998 |
| WO | WO 97/26066 | 7/1997 |

* cited by examiner

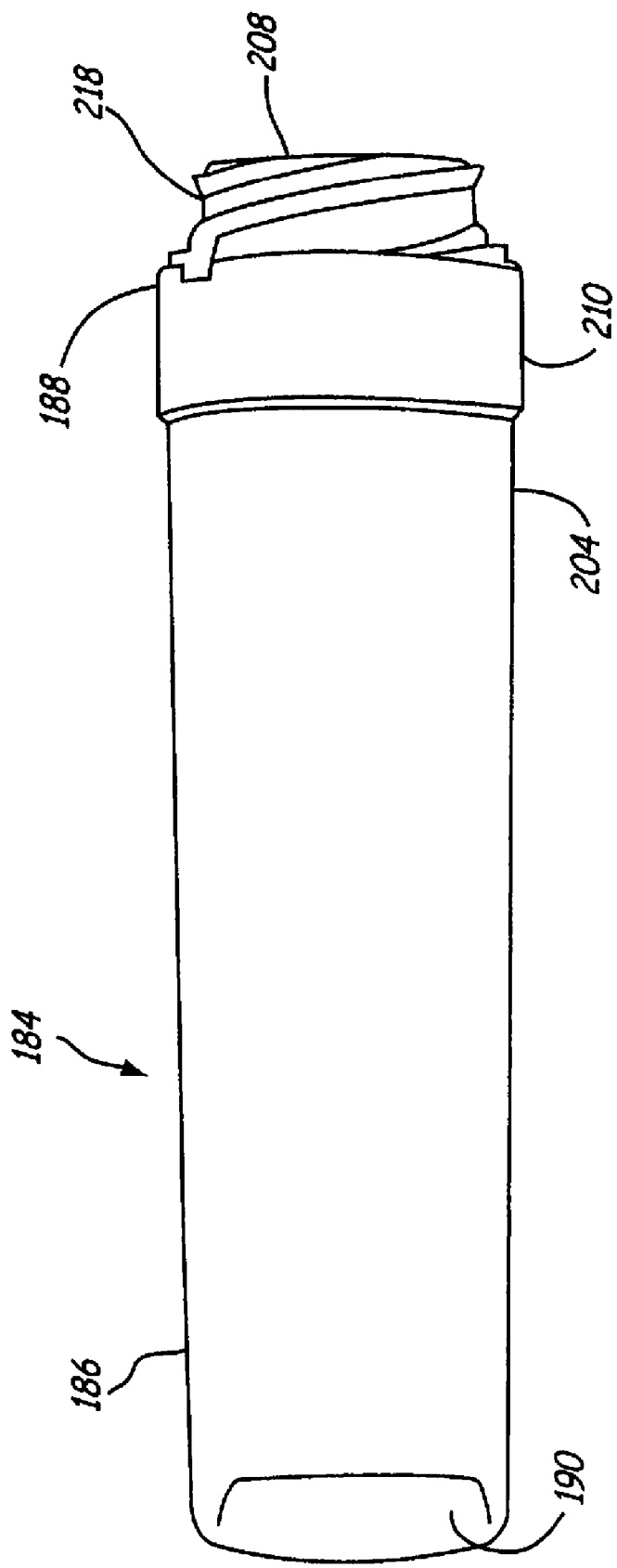

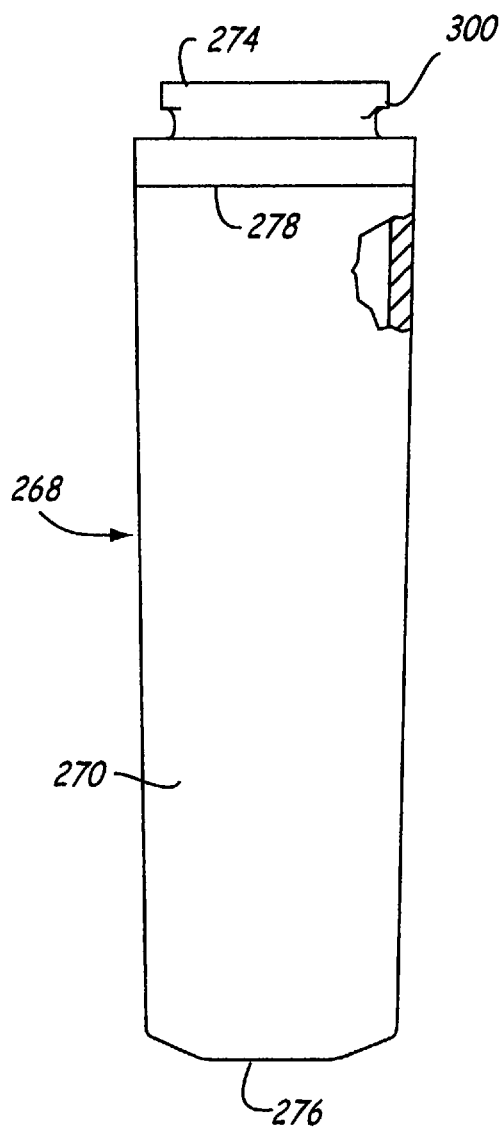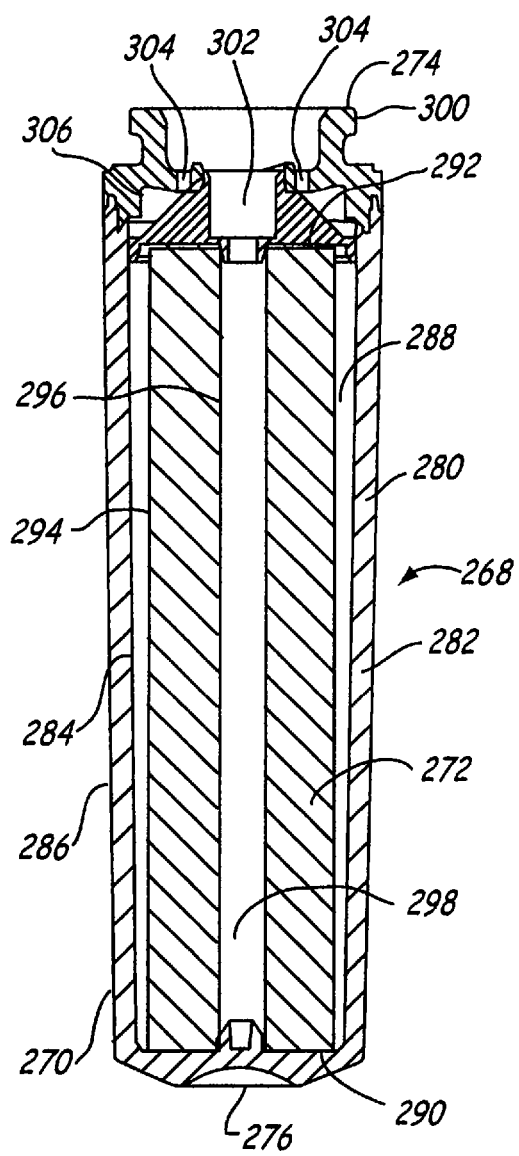
Fig. 19
Fig. 20

FREEZE RESISTANT WATER FILTER

RELATED APPLICATIONS

This application is a continuation of U.S. patent application Ser. No. 10/377,022, now abandoned filed Feb. 28, 2003, which claims the benefit of U.S. Provisional Application No. 60/427,770, filed Nov. 20, 2002, the disclosures of which are incorporated herein by reference in their entirety.

FIELD OF THE INVENTION

The present invention relates generally to the field of point-of-use water filtration products. More specifically, the present invention relates to a replaceable filter cartridge for use in a refrigerator, the filter cartridge constructed in manner that resists bursting when exposed to freezing conditions.

BACKGROUND OF THE INVENTION

A common feature found in many of the refrigerators sold today is an internal water filtering system capable of supplying filtered water to either a drinking dispenser or to an icemaker. In most applications, these filter systems use a filter medium having the capacity to remove chlorine and particulate matter from the source water resulting in cleaner, better tasting water and ice.

When designing these filter systems, an important design consideration is the amount of space that the filter will occupy. This is because any space occupied by the filter will reduce available food storage space within the refrigerator. One way to reduce the space consumed by a water filter system is to use a replaceable cartridge filter. The replaceable cartridge filter typically has enough filtering capacity to last months at a time before it needs to be replaced by a fresh filter.

Previous refrigerator water system designs have included means to protect the water filter by integrating an isolation solenoid valve before the house connection and filter. This valve is only open while filtered water is called for and thus eliminates the potential for flooding in the event of a structural filter failure. In a effort to reduce system complexity and cost, refrigerator manufactures have sought to eliminate the isolation valve and run the filters at a continuous high pressure. One way of replacing the isolation solenoid valve has been to incorporate shut-off means within the filter system itself. One example of such shut-off means is a spring valve within a manifold that closes the water supply line when a filter cartridge is removed.

While the filter shut-off means are effective when a filter cartridge is removed from the system, these shut-off means are ineffective when an event causes a structural failure of the filter cartridge while it is still engaged with the manifold. If a refrigerator lacks the isolation valve, water will continue to flow into and out of the damaged cartridge. The potential exists for such continuous spills to cause damage to flooring in the area surrounding the refrigerator. One way in which a filter cartridge can suffer structural damage is when standing water within the cartridge freezes solid. As the water turns to ice, it expands which can lead to the cracking or bursting of the filter housing.

Present filter cartridge designs utilize conventional, rigid polyolefin polymers, usually unmodified talc-filled polypropylene, due to their fatigue and chemical resistance, low cost, low creep and low toxicity. Unfortunately, these materials tend to have glass transition temperatures that cause them to become brittle at temperatures in the freezing range. In addition to becoming brittle, conventional polypropylene resins have an ultimate elongation percentage of approximately 5-30% while above the glass transition temperature. This combination of limited elasticity and brittleness at freezing temperatures makes polypropylene a less than ideal polymer for use in a refrigerator water filter cartridge that must survive freezing conditions.

The present invention is a freeze resistant filter cartridge assembly, and includes a filter cartridge including a filter housing and a filter media and having at least one component selected from a list of components consisting of:

the filter housing being formed of an increased elasticity polyolefin polymer having elongation and glass transition properties that allow for stretching of the housing during a freezing event rather than rupturing;

a sleeve having volume of air is entrapped therein within and being disposed in the interior of the filter cartridge; and the filter housing formed of a conventional, rigid polyolefin having a wall thickness great enough to resist freeze induced expansion stresses. The present invention is further a method of forming a freeze resistant filter cartridge assembly.

SUMMARY OF THE INVENTION

Utilizing a variety of techniques, the filter cartridge of the present invention can resist failure in a freezing event by either incorporating polymers having desired traits, including pressure absorbing elements within the cartridge and/or increasing wall strengths to withstand freeze induced stresses. In one aspect, the invention pertains to a freeze resistant water filter. The freeze resistant water filter embodiments include, for example, the filters substantially describe herein. The invention further pertains to uses of a freeze resistant water filters and to methods of manufacturing freeze resistant water filters.

In a first embodiment, the filter housing is made of a polymer having elongation and glass transition properties that allow for stretching of the housing during a freezing event rather than rupturing. Advances in polyolefin chemistry have yielded polymers combining these desired traits of strength and elasticity. A variety of increased elasticity polyolefins such as metallocene modified polypropylene or polyethylene polymers and copolymers, have been developed with ultimate elongation percentages exceeding 800%, as measured by testing procedure ASTM D638, versus a standard elongation percentage of around 5-30% for conventional polyolefins. Similarly low density polyethylene polymers such as Dow Chemical's Dowlex® can be utilized. Dowlex® has an ultimate elongation percentage exceeding 750%. In addition, high density polyethylene polyethylene polymers such as Equistar's Alathon® can be utilized. Alathon® has an ultimate elongation percentage exceeding 1,900%. While these elastic polyolefin polymers have ultimate elongation percentages exceeding 700%, other elastic polyolefin polymers having ultimate elongation percentages exceeding 100% could also be used in place of conventional polyolefins. Regardless of the polymer selected, these increased elasticity polyolefins share the traits of considerable strength, increased elasticity, low creep and low cost. These modified polyolefin polymers can be used to manufacture filter housings having thinner walls while still providing adequate strength and elasticity to survive freezing events.

In a variation on this embodiment, the filter housing can comprise a plurality of polymers. An elastic polyolefin can be selected as the housing polymer based on its elasticity and strength traits while the interface cap polymer is chosen for its strength and rigidity characteristics.

In another embodiment, a volume of air is entrapped within the interior of the filter cartridge during manufacturing. This entrapped air can be present in the form of closed-cell foam or suitable non-popping bubble wrap. During a freezing event, this entrapped air allows ice to expand inwardly by compressing the entrapped air rather than expanding outwardly against the cartridge housing. As outward expansion against the cartridge housing has been reduced, such a design could include a reduced wall thickness for the cartridge housing.

In another alternative embodiment, the aforementioned embodiments can be combined to yield a filter housing constructed of polymers having desired elasticity and strength traits while incorporating entrapped air within the interior volume of the cartridge filter.

In another alternative embodiment, a cartridge filter can be designed using standard unmodified polyolefin construction, most typically unmodified talc-filled polypropylene, for the filter housing itself. A filter element is selected that has a reduced porosity throughout its thickness such that the amount of entrained water available to freeze is reduced. Despite the inherent traits of unmodified polypropylene, the filter cartridge can be constructed using a wall thickness great enough to resist the freeze induced expansion stresses of this reduced water volume.

BRIEF DESCRIPTION OF THE DRAWINGS

FIG. 10 is a side view of the filter cartridge of FIG. 9;

FIG. 19 is a side view of an embodiment of a freeze resistant filter cartridge; and FIG. 20 is a sectional, side view of the filter cartridge of FIG. 19.

DETAILED DESCRIPTION OF THE DRAWINGS

Figure 1:
FIG. 1 is a perspective view of a burst filter cartridge.

Depicted in FIG. 1 is a commercially available residential filter cartridge 100 following prolonged exposure to freezing conditions. As is typical of most commercially available cartridges, filter cartridge 100 is made of a conventional rigid, unmodified talc-filled polypropylene polymer. Filter cartridge 100 is comprised of a generally cylindrical housing 102 and a cartridge head 104. Filter cartridge 100 is defined by a biasing end 106 and an engagement end 108. Cartridge head 104 includes an interconnecting member 110, depicted as an insertion ramp, that interfaces with a water distribution manifold. Biasing end 106 includes a projecting grip 112 for use when attaching or removing filter cartridge 100 from the water distribution manifold. Evident on the surface of filter cartridge 100 is a brittle fracture 114 extending linearly along the length of the filter cartridge 100. Fracture 114 is a representative failure mode for filter cartridge 100 constructed of conventional polyolefin polymers following prolonged exposure to freezing conditions during actual use. Fracture 114 is caused by expansion stresses created during the formation of ice from liquid water causing filter cartridge 100 to burst.

Figure 2:
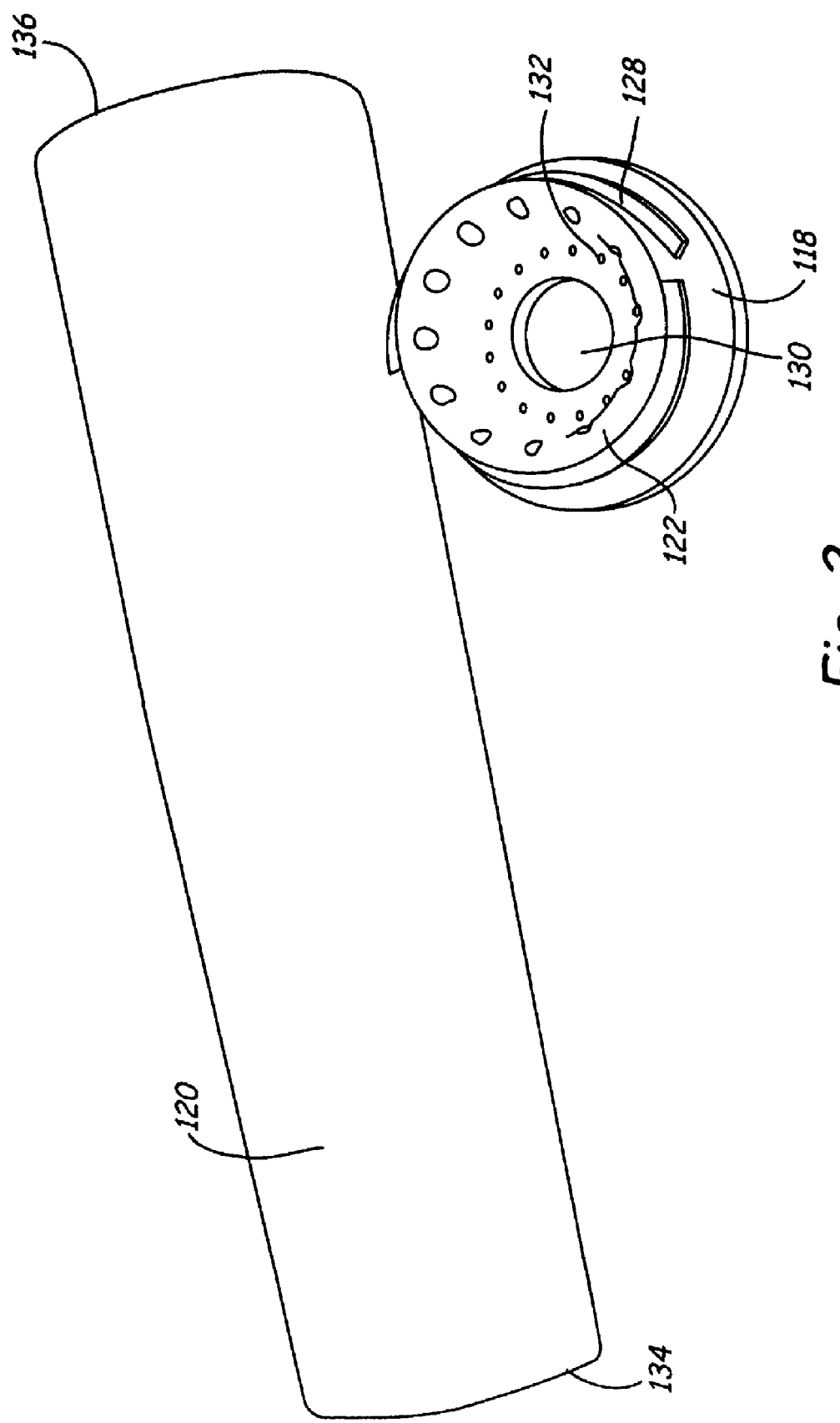
FIG. 2 is an exploded perspective view of an embodiment of a freeze resistant filter cartridge.
Figure 3:
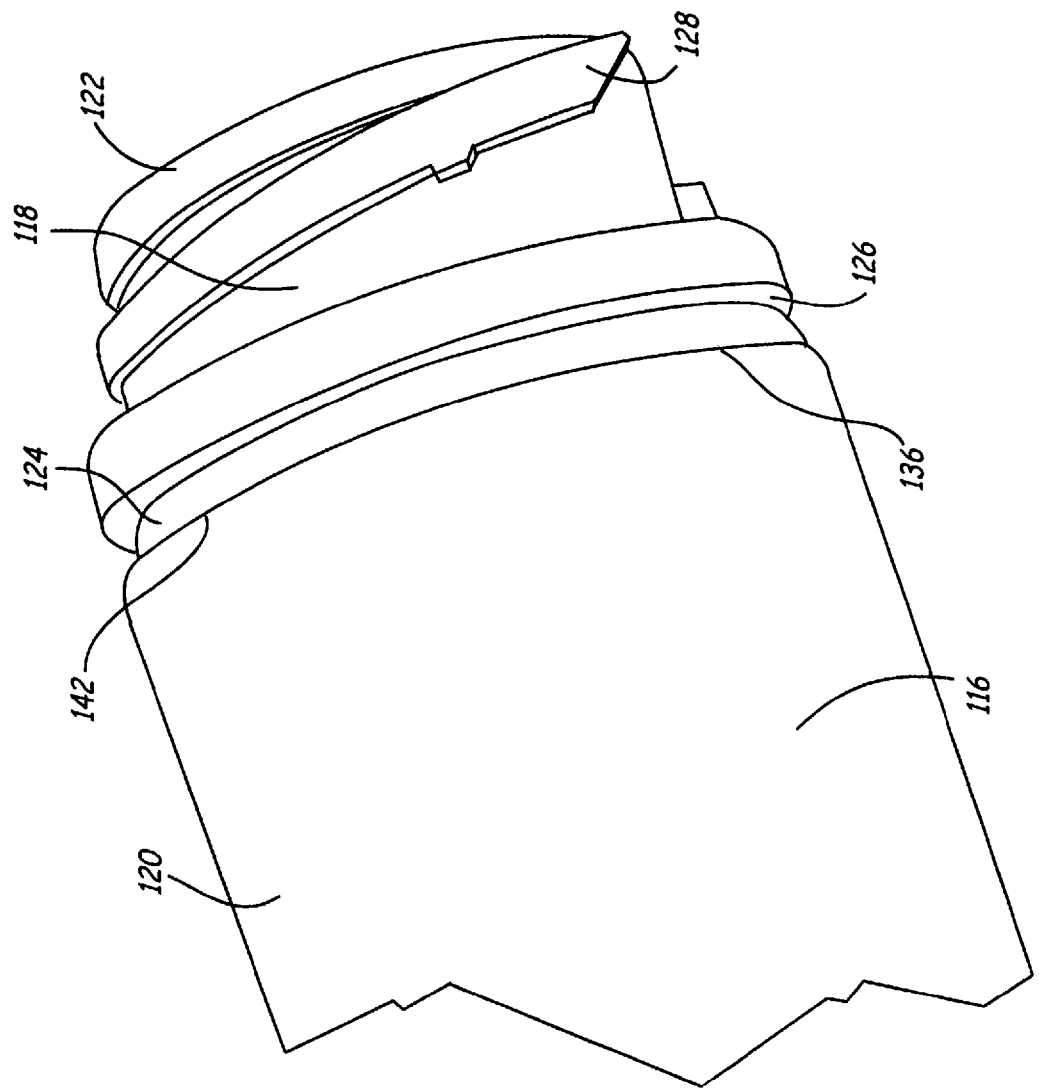
FIG. 3 is a perspective, view of an end of the freeze resistant filter cartridge of FIG. 2.
Figure 4:
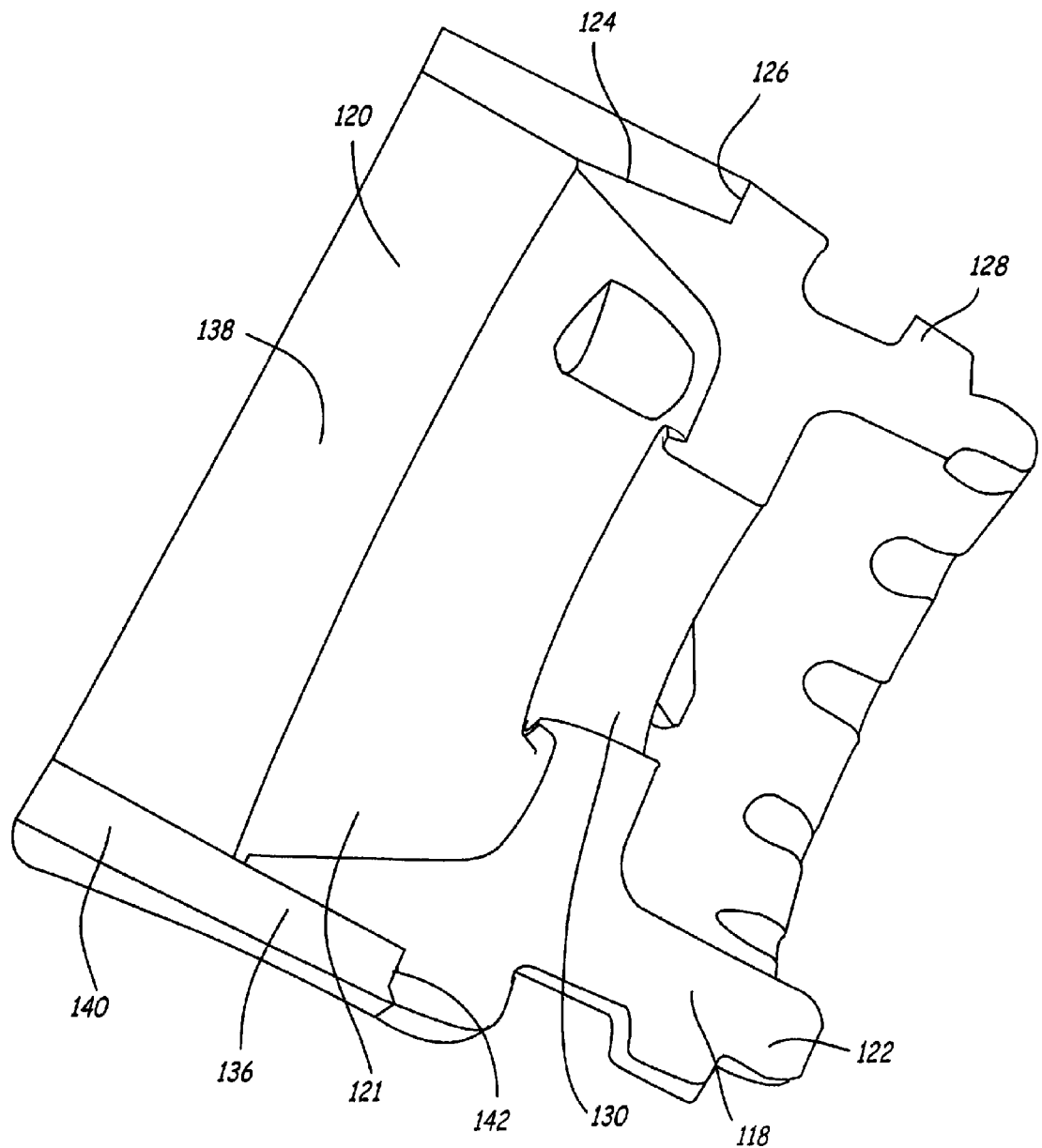
FIG. 4 is a sectional, perspective view of an end of the freeze resistant filter cartridge of FIG. 2.
Figure 5:
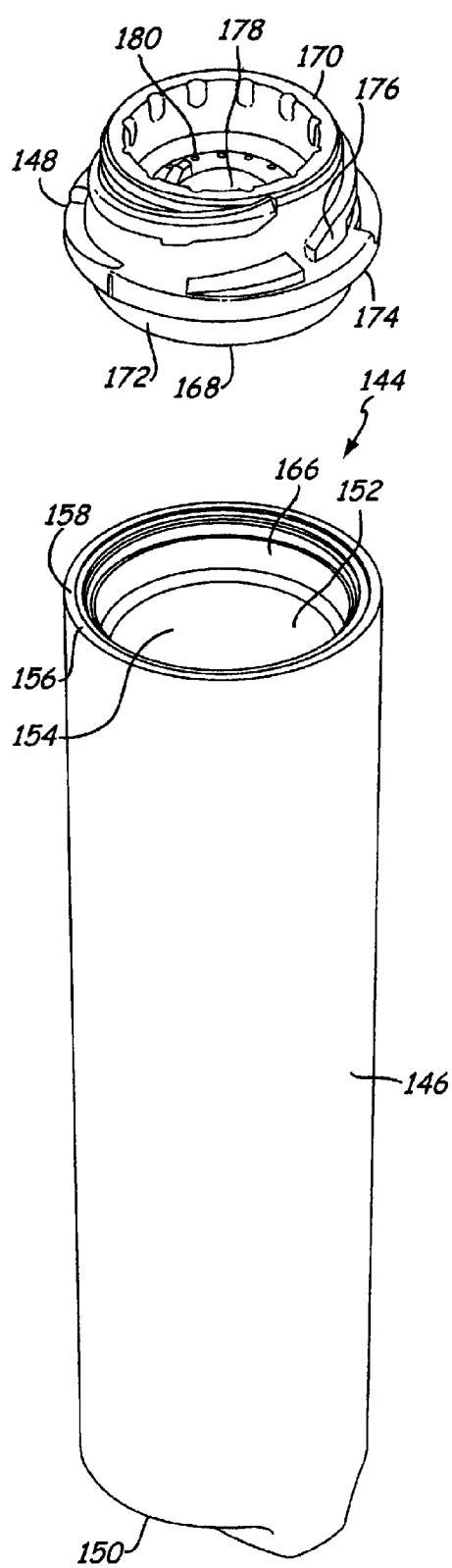
FIG. 5 is an exploded perspective view of an embodiment of a freeze resistant filter cartridge.
Figure 9:
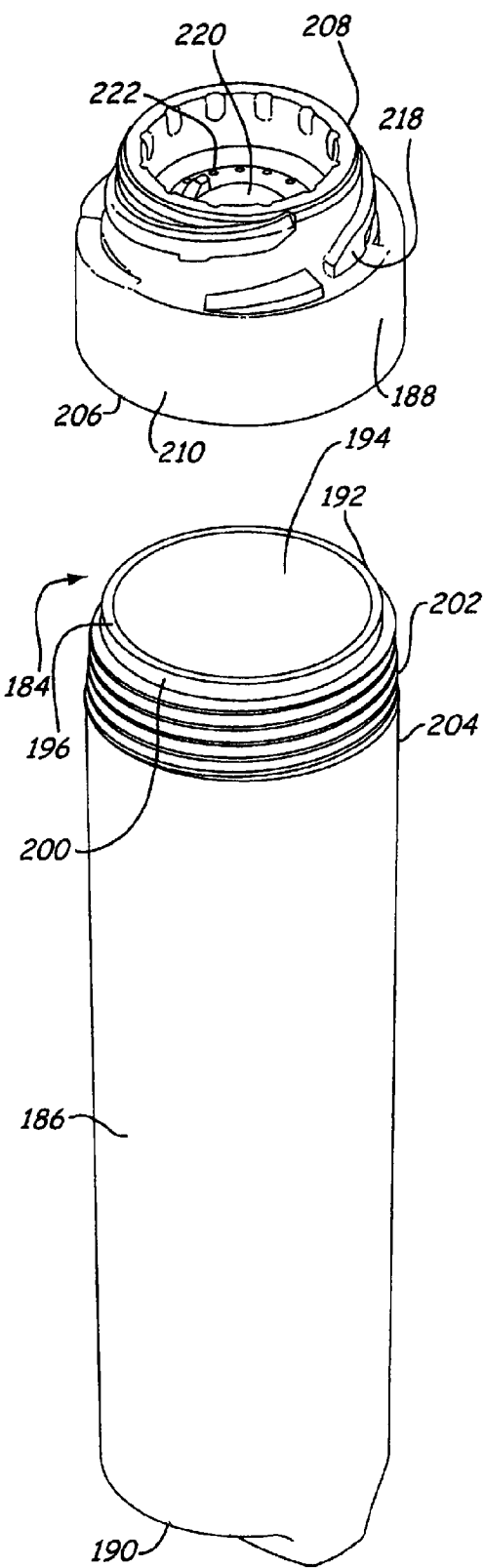
FIG. 9 is an exploded perspective view of an embodiment of a freeze resistant filter cartridge.
Figure 6:
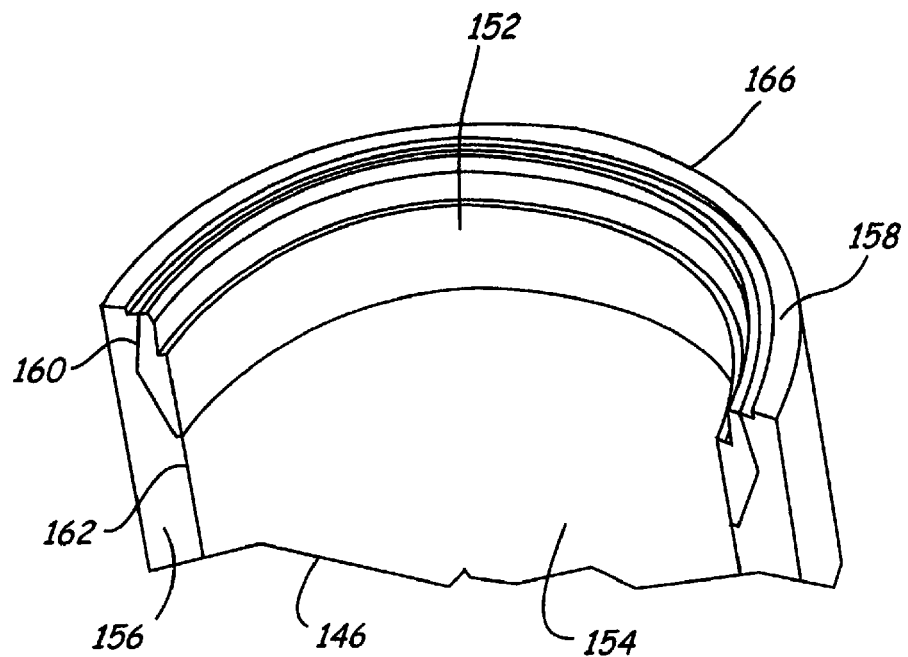
FIG. 6 is a sectional, perspective view of a cartridge housing for the filter cartridge of FIG. 5.
Figure 7:
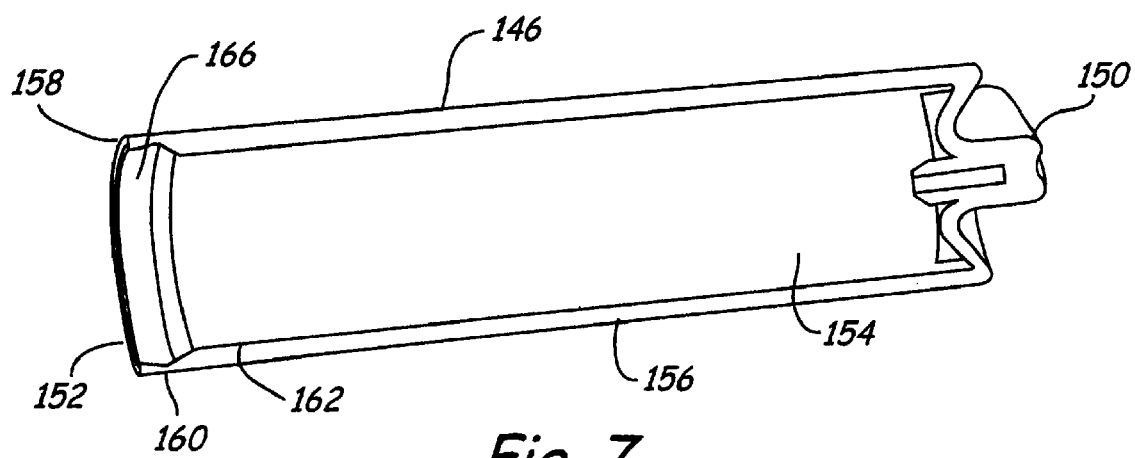
FIG. 7 is a sectional, perspective view of the cartridge housing for the filter cartridge of FIG. 5.
Figure 8:
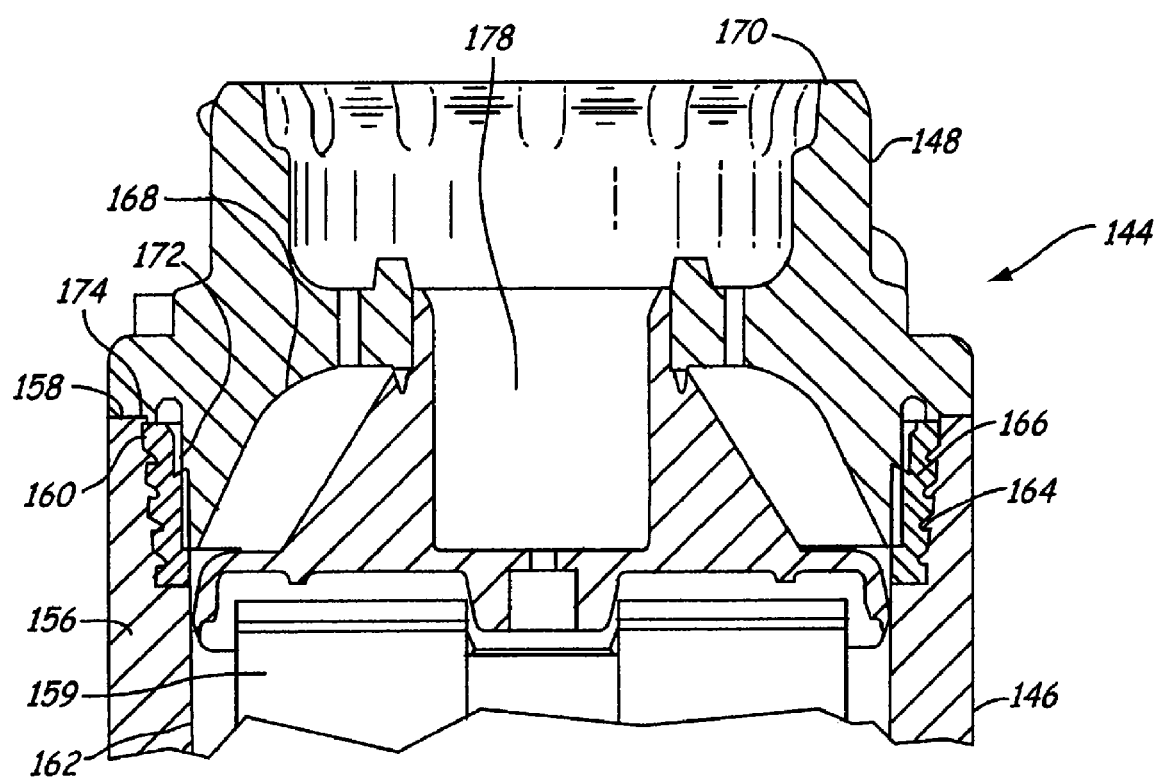
FIG. 8 is a sectional, side view of the filter cartridge of FIG. 5.
Figure 12:
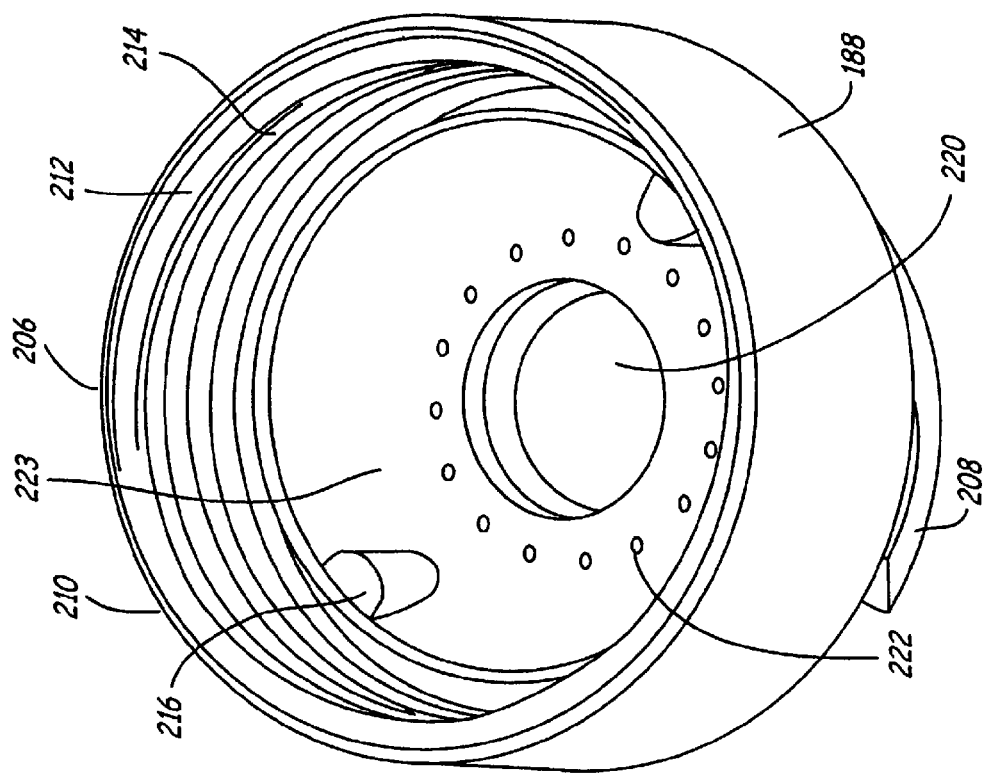
FIG. 12 is a bottom, perspective view of a cartridge head for the filter cartridge of FIG. 9.
Figure 11:
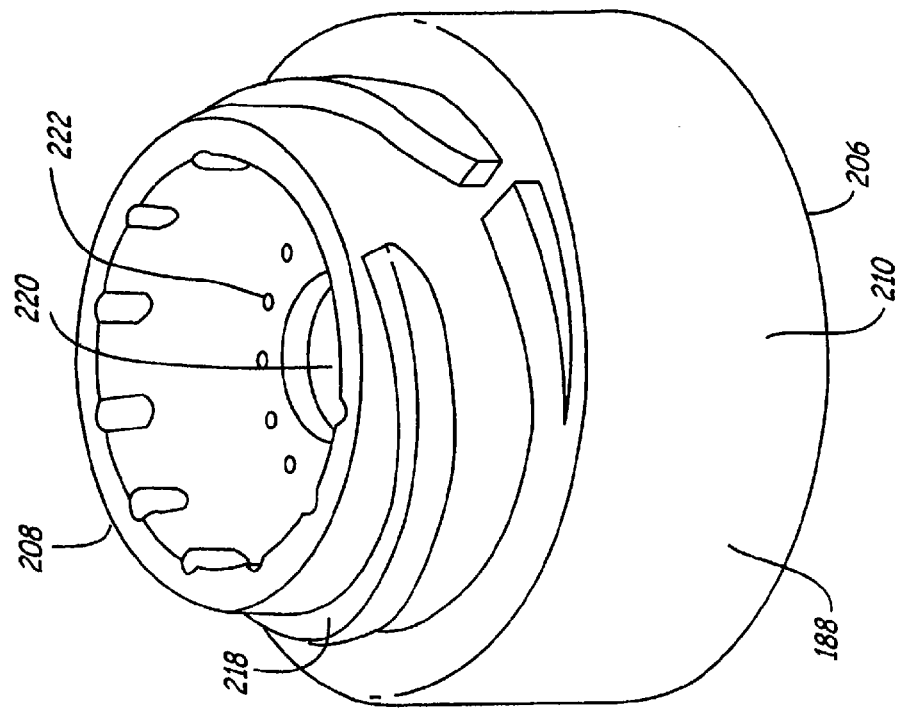
FIG. 11 is a top, perspective view of a cartridge head for the filter cartridge of FIG. 9.
Figure 13:
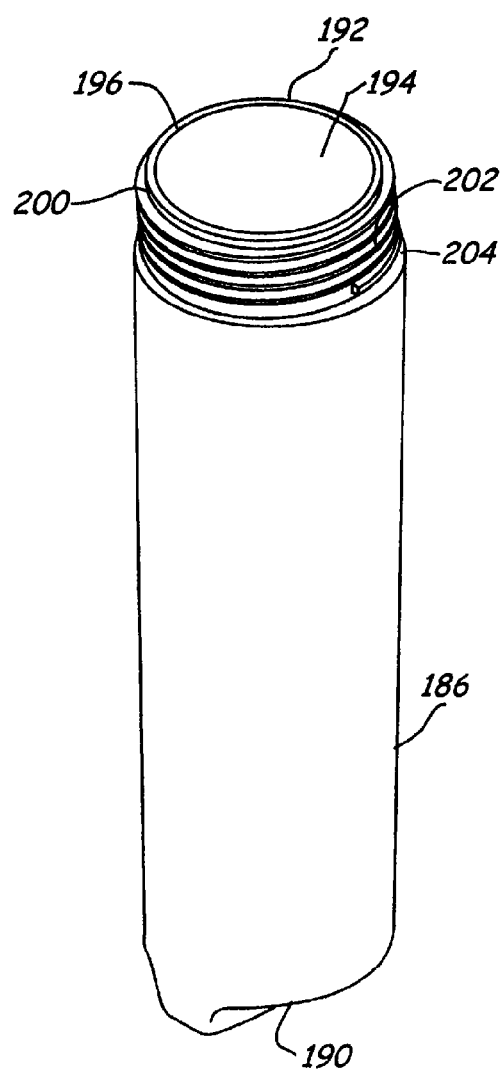
FIG. 13 is a perspective view of a cartridge housing for the filter cartridge of FIG. 9.
Figure 14:
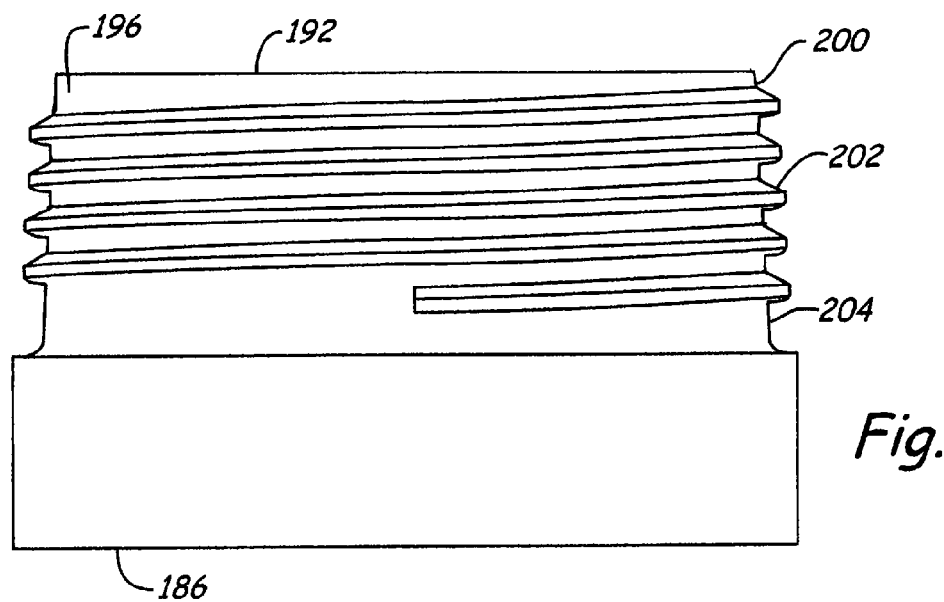
FIG. 14 is a side view of the cartridge housing for the filter cartridge of FIG. 9.
Figure 15:
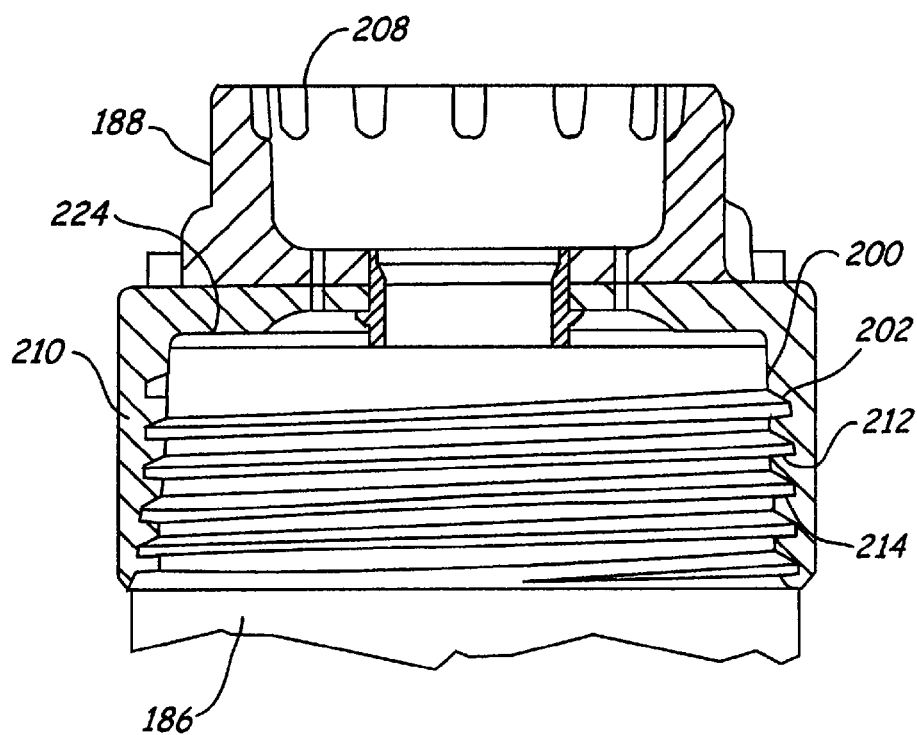
FIG. 15 is a sectional, side view of the filter cartridge of FIG. 9.
Figure 16:
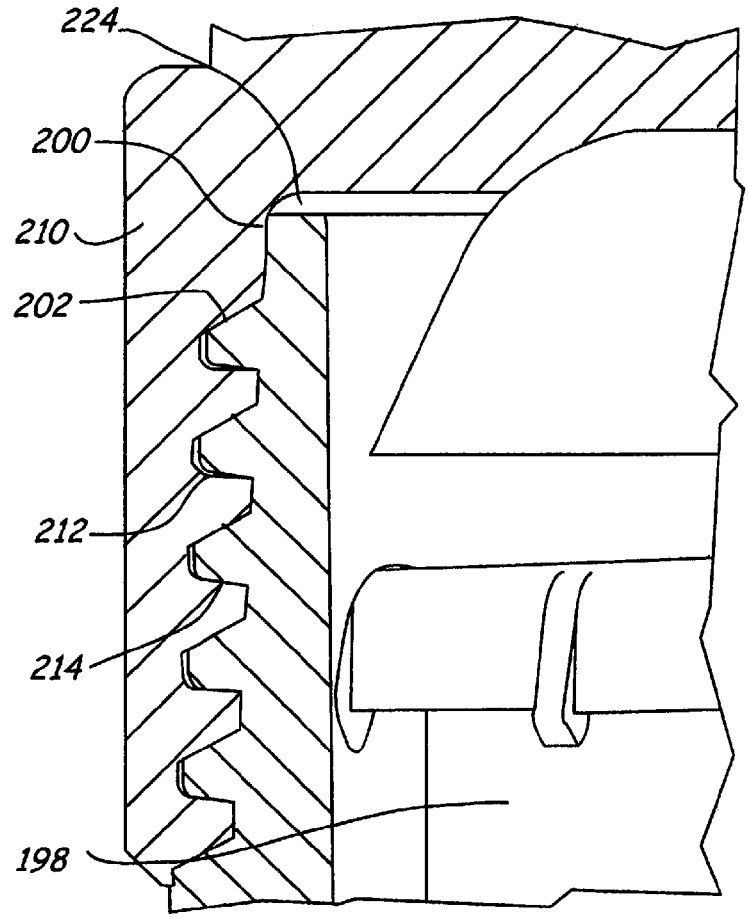
FIG. 16 is a sectional, side view of the filter cartridge of FIG. 9.

FIGS. 2-4 depict an embodiment of a freeze resistant filter cartridge 116. Filter cartridge 116 comprises a cartridge head 118 and an elastic cartridge housing 120. Cartridge housing 120 is preferably constructed of an increased elasticity polyolefin polymer having an ultimate elongation percentage exceeding at least about 100% and in some embodiments exceeding about 700%, as well as values between these elongation percentages. Examples of suitable polyolefin polymers include metallocene modified polypropylenes and polyethylenes, low density polyethylenes and high density polyethylenes. Preferably, cartridge head 118 is constructed of the same modified polyolefin polymer as cartridge housing 120. Alternatively, cartridge head 118 can comprise other polyolefin polymers that exhibit bonding properties making it compatible for use with the elastic polyolefin polymer of cartridge housing 120. Generally, cartridge head 118 and cartridge housing 120 are formed using a variety of forming processes including but not limited to injection molding, compression molding and extrusion. As cartridge head 118 and cartridge housing 120 preferably comprise the same polymer or alternatively comprise compatible polymers, a wide variety of bonding methods can be used to construct filter cartridge 116. Methods for bonding cartridge head 118 and cartridge housing 120 could include but are not limited to spin welding, hot-plate, electro-magnetic radiation heating, sonic welding, adhesive bonding, laser welding or any combination thereof. Generally, cartridge head 118 includes an insertion end 121 and a connecting end 122. Insertion end 121 includes an insertion surface 124 and an insertion flange 126. Connecting end 122 includes a connection member 128. Cartridge head 118 also includes a central inlet bore 130 and a plurality of outlet bores 132. Cartridge housing 120 includes a closed end 134, an open end 136, an interior cavity 138, a cartridge wall 140 and a sealing face 142.

In FIGS. 5-8, an alternative embodiment of a freeze resistant filter cartridge 144 is depicted. Filter cartridge 144 includes an elastic cartridge housing 146 and a rigid cartridge head 148. Cartridge housing 146 comprises a polyolefin polymer having an ultimate elongation percentage exceeding at least about 100% and in some embodiments exceeding about 700%, as well as values between these elongation percentages. Examples of suitable polyolefin polymers include metallocene modified polypropylenes and polyethylenes, low density polyethylenes and high density polyethylenes. Cartridge head 148 comprises a conventional rigid polyolefin polymer such as polypropylene. Generally, cartridge head 148 and cartridge housing 146 are formed using a variety of forming processes including but not limited to injection molding, compression molding and extrusion. In this embodiment, cartridge housing 146 includes a closed end 150, an open end 152, an interior cavity 154, a cartridge wall 156 and a sealing face 158. Generally, a filter element 159 is located within interior cavity 154. Located at open end 152 is a circumferential groove 160 in an inner wall surface 162. Circumferential groove 160 includes a plurality of molded protrusions 164 extending from the inner wall surface 162. Located within circumferential groove 160 and fixedly attached to molded protrusions 164 as shown in these Figs., is a molded insert weld-ring 166. Weld-ring 166 can be comprised of the same polyolefin polymer as rigid cartridge head 148, however, weld-ring 166 could comprise any polymer, other than the polymer comprising cartridge housing 146, capable of bonding with rigid cartridge head 148. For example, when forming the cartridge housing 146, weld-ring 166 can be pre-molded and placed within the mold for the cartridge housing 146 although other inset molding techniques could be used. Such bonding methods could include but are not limited to spin welding, hot-plate, electromagnetic radiation heating, sonic welding, adhesive bonding, laser welding or any combination thereof. Generally, cartridge head 148 includes an insertion end 168 and a connecting end 170. Insertion end 168 includes an insertion surface 172 and an insertion flange 174. Connecting end 170 includes a connection member 176. Cartridge head 148 also includes a central inlet bore 178 and a plurality of outlet bores 180. In alternative embodiments, cartridge housing 146 can integrally include structure corresponding to insert weld-ring 166 if the polymer of elastic cartridge housing 146 is appropriately bondable to rigid cartridge head 148. In this alternative embodiment, the structure is as shown in FIGS. 5-8 except that the material of cartridge housing 146 is uniform instead of a composite of two materials.

Depicted in FIGS. 9-16 is another alternative embodiment of a freeze resistant filter cartridge 184. Filter cartridge 184 includes an elastic cartridge housing 186 and a rigid cartridge head 188. Cartridge housing 186 comprises a polyolefin polymer having an ultimate elongation percentage exceeding at least about 100% and in some embodiments exceeding about 700%, as well as values between these elongation percentages. Examples of suitable polyolefin polymers include metallocene modified polypropylenes and polyethylenes, low density polyethylenes and high density polyethylenes. Cartridge head 188 comprises a conventional rigid polyolefin polymer such as polypropylene. Generally, cartridge head 188 and cartridge housing 186 are formed using a variety of forming processes including but not limited to injection molding, compression molding and extrusion. In this embodiment, cartridge housing 186 includes a closed end 190, an open end 192, an interior cavity 194 and a cartridge wall 196. Generally, a filter element 198 is located within interior cavity 194. Open end 192 includes a guiding surface 200 and a circumferential, external thread 202 around outer wall surface 204. Cartridge head 188 includes an insertion end 206 and a connecting end 208. Insertion end 206 includes an insertion wall 210. Insertion wall 210 has a diameter slightly larger than open end 192. Insertion wall 210 includes an inside surface 212 with an internal thread 214. Insertion end 206 also includes an insertion stop 216. Connecting end 208 includes a connection member 218. Cartridge head 188 also includes a central inlet bore 220, a plurality of outlet bores 222 and a trough 223 surrounding central inlet bore 220. When cartridge head 188 and cartridge housing 186 are attached, a gap 224 is created.

Figure 17:
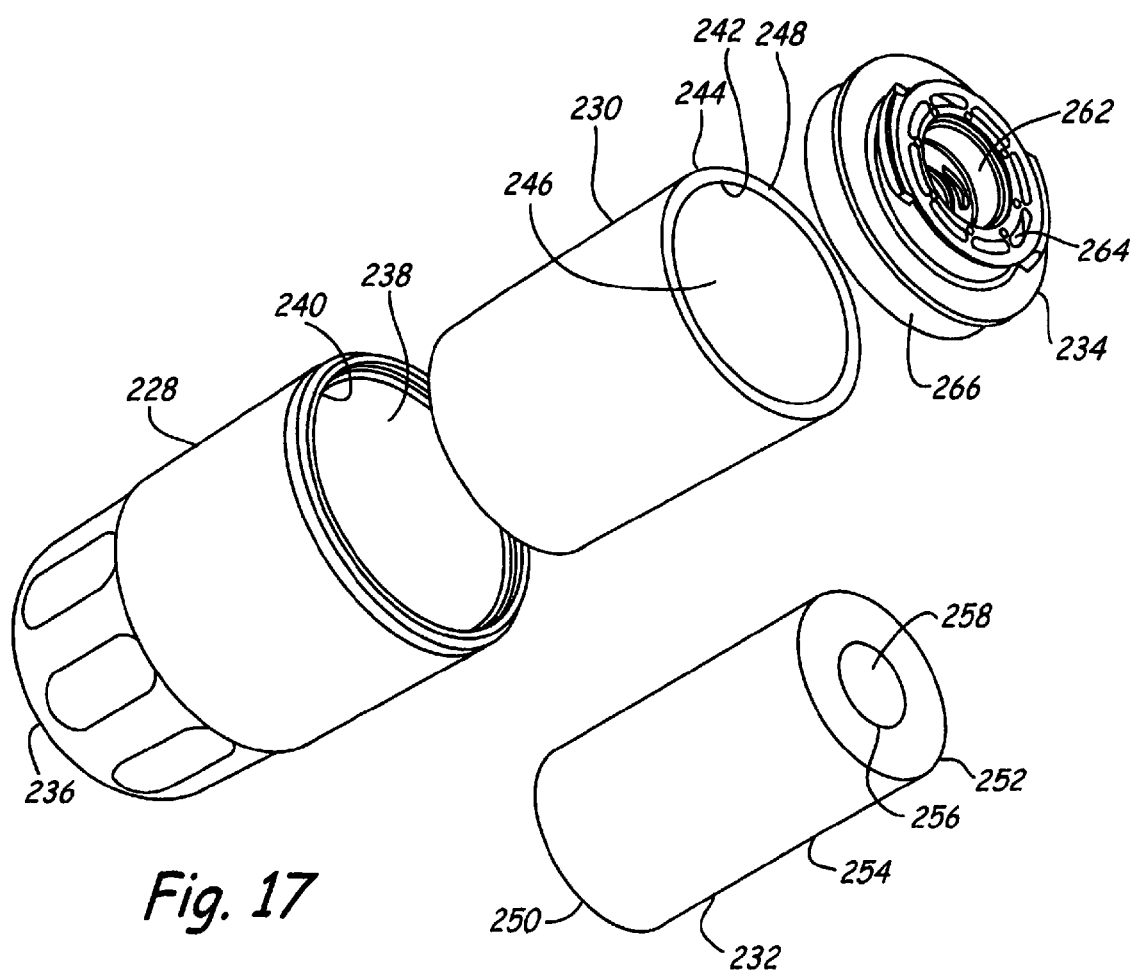
FIG. 17 is an exploded perspective view of an embodiment of a freeze resistant filter cartridge.
Figure 18:
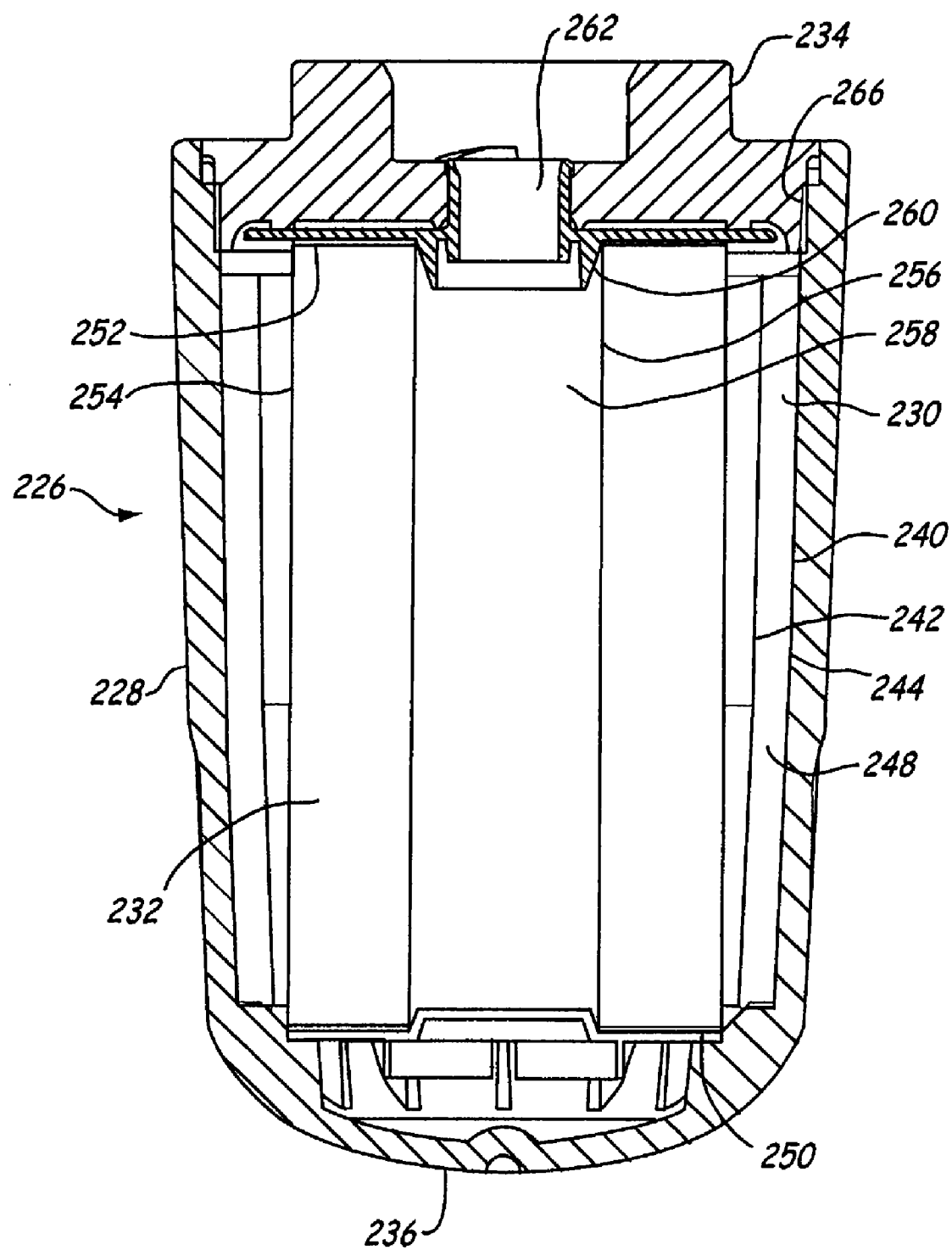
FIG. 18 is a sectional, side view of the filter cartridge of FIG. 17.

FIGS. 17 and 18 depict an alternative embodiment of a freeze resistant filter cartridge 226. Filter cartridge 226 consists of a cartridge housing 228, a compression sleeve 230, a filter element 232 and a cartridge head 234. Generally, cartridge head 234 and cartridge housing 228 are formed using a variety of forming processes including but not limited to injection molding, compression molding and extrusion. Cartridge housing 228 has a generally cylindrical configuration defined by a close end 236, an open end 238 and an inner wall 240. Compression sleeve 230 has a generally cylindrical configuration defined by an inner sleeve wall 242 and an outer sleeve wall 244. Inner sleeve wall 242 defines a sleeve cavity 246. Inner sleeve wall 242 and outer sleeve wall 244 define a sealed air pocket 248. Examples of sealed air pocket 248 include entrapped air present in the form of closed-cell foam or suitable non-popping bubble wrap. Filter element 232 has a generally cylindrical configuration defined by a distal end 250, a proximal end 252, an outer element wall 254, an inner element wall 256 and a continuous through-bore 258. Cartridge head 234 includes a projecting interface 260, a central inlet bore 262, a plurality of outlet bores 264 and a collar 266.

FIGS. 19 and 20 depict another alternative embodiment of a freeze resistant filter cartridge 268. Filter cartridge 268 includes a cartridge housing 270, a filter element 272 and a cartridge head 274. Generally, cartridge head 274 and cartridge housing 270 are formed using a variety of forming processes including but not limited to injection molding, compression molding and extrusion. Cartridge housing 270 has a generally cylindrical configuration defined by a closed end 276, an open end 278 and a wall 280. Wall 280 has a wall thickness 282 defined by an inner wall surface 284 and an exterior wall surface 286. Preferably, wall thickness 282 is selected from the range of about ⅛ inch to about ½ inch. Interior wall surface 284, closed end 276 and open end 278 define an interior cavity 288. Filter element 272 has a generally cylindrical configuration defined by a distal end 290, a proximal end 292, an outer element wall 294, an inner element wall 296 and a continuous through-bore 298. Cartridge head 274 includes a projecting interface 300, a central inlet bore 302, a plurality of outlet bores 304 and a collar 306.

In the first embodiment depicted in FIGS. 2-4, the filter cartridge 116 includes a filter element (not shown) mounted within interior cavity 138. This filter element is likely to be similar in appearance and construction to filter element 159. The filter element is held in position by permanently attaching cartridge head 118 to elastic cartridge housing 120. Insertion surface 124 is inserted into interior cavity 138 until insertion flange 126 comes into contact with sealing face 142. Insertion flange 126 and sealing face 142 are permanently bonded to complete the assembly of filter cartridge 116. In practice, the cartridge head 118 of filter cartridge 116 will be interconnectable to a filter manifold (not shown).

In an alternative embodiment depicted in FIGS. 5-8, filter cartridge 144 includes filter element 159 mounted within interior cavity 154. Filter element 159 can comprise a variety of filtering media including but not limited to depth filtration media, absolute filtration media, activated carbon media, ion exchange media and any combination thereof. Filter element 159 can be held in position by permanently attaching rigid cartridge head 148 to elastic cartridge housing 146. As rigid cartridge head 148 and elastic cartridge housing 146 comprise different polymers, standard attachment methods may not be applicable. In order to promote attachment, weld-ring 166 can be insert molded into circumferential groove 160. Molded protrusions 164 promote adherence of weld-ring 166 and elastic cartridge housing 146. Weld-ring 166 can comprise the same polymer as rigid cartridge head 148, though any polymer capable of bonding to rigid cartridge head 148 could be used. Insertion surface 172 is inserted into interior cavity 154 until insertion flange 174 comes into contact with sealing face 158. Rigid cartridge head 148 and elastic cartridge housing 146 can the be permanently bonded to complete the assembly of filter cartridge 116. As discussed previously, elastic cartridge housing 146 can integrally include structure corresponding to insert weld-ring 166 which would be bondable to rigid cartridge head 148 using the same bonding methods.

In another alternative embodiment depicted in FIGS. 9-16, filter cartridge 184 includes filter element 198 mounted within interior cavity 194. Filter element 198 can comprise a variety of filtering media including but not limited to depth filtration media, absolute filtration media, activated carbon media, ion exchange media and any combination thereof. Filter element 198 is held in position by attaching rigid cartridge head 188 to elastic cartridge housing 186. Guiding surface 200 is positioned within insertion end 206 until external thread 202 is in contact with internal thread 214. Rigid cartridge head 188 and elastic cartridge housing 186 are then rotatably interconnected by way of internal thread 214 and external thread 202. Preferably, an amount of hot melt glue or other suitable adhesive, such as epoxy, is applied to trough 223 prior to threading rigid cartridge head 188 to elastic cartridge housing 186. The hot melt glue or adhesive serves to permanently bond rigid cartridge head 188 to elastic cartridge housing 186 to complete filter cartridge 182, preferably by bonding internal thread 214 and external thread 202. In addition to bonding cartridge head 188 and elastic cartridge housing 186, hot melt glue or adhesive fills gap 224 and acts as a gasket or seal to prevent water leakage.

In another alternative embodiment depicted in FIGS. 17 and 18, filter cartridge 226 is assembled by placing compression sleeve 230 into open end 238 of cartridge housing 228 such that outer sleeve wall 244 and inner wall 240 are in contact. Next, filter element 232 is placed within sleeve cavity 246 of compression sleeve 230. Filter element 226 can comprise a variety of filtering media including but not limited to depth filtration media, absolute filtration media, activated carbon media, ion exchange media and any combination thereof. Filter element 226 is held in position by attaching cartridge head 234 to cartridge housing 228. Projecting interface 260 is positioned so that it inserts into through-bore 258 of filter element 232. Collar 266 inserts into open end 238 of cartridge housing 228 facilitating the bonding of cartridge head 234 and cartridge housing 228. Bonding can take by place by any number of suitable methods including but not limited to spin welding, hot-plate, electromagnetic radiation heating, sonic welding, adhesive bonding, laser welding or any combination thereof.

In another alternative embodiment depicted in FIGS. 19 and 20, filter cartridge 268 is assembled by placing filter element 272 into open end 278 of cartridge housing 270 such that distal end 290 is in proximity to closed end 276. Filter element 272 can comprise a variety of filtering media including but not limited to depth filtration media, absolute filtration media, activated carbon media, ion exchange media and any combination thereof. Preferably, filter element 272 is manufactured such that it has a reduced internal porosity to assist in reducing the volume of entrained water. Filter element 272 is held in position by attaching cartridge head 274 to cartridge housing 270. Collar 306 is positioned so that it inserts into open end 278 and inlet bore 302 and through-bore 298 are in alignment. Cartridge head 274 can be bonded to cartridge housing 270 by any suitable method including but not limited to spin welding, hot-plate, electromagnetic radiation heating, sonic welding, adhesive bonding, laser welding or any combination thereof.

In practice, the cartridge filters of the present invention are used in conjunction with water filtration systems used in appliance such as refrigerators. Examples of representative filter systems are disclosed in U.S. Pat. Nos. 5,753,107, 6,027,644, and 6,193,884 as well as in U.S. patent application Ser. Nos. 09/918,316, entitled "Low Spillage Replaceable Water Filter Assembly and 10/202,290, entitled "Hot Disconnect Replaceable Water Filter Assembly", all of which are hereby incorporated by reference in their entirety. Generally, unfiltered water flows from a water source (not depicted) to a water manifold (not depicted). From the water manifold, water is directed into a filter cartridge. This filter cartridge could be any of the aforementioned embodiments. Unfiltered water flows into the filter cartridge, through the filter element, out the filter cartridge, into the manifold as filtered water and then to the points of use. When filtered water is not being used, the open volume of filter cartridge is filled with water. If the filter cartridge is exposed to freezing conditions, water can begin to freeze and begin to expand. As the water turns to ice and expands, the ice will expand outwardly subjecting the filter cartridge to expansion stresses.

When filter cartridge 116 is exposed to expansion stress, elastic cartridge housing 120 begins to stretch, expand and deform rather than bursting and suffering a failure such as fracture 114. Because cartridge housing 120 is comprised of an increased elasticity polyolefin polymer having an increased ultimate elongation percentage, the integrity of filter cartridge 116 is maintained.

When filter cartridge 144 is exposed to expansion stress, elastic cartridge housing 146 begins to stretch, expand and deform rather than bursting and suffering a failure such as brittle fracture 114. Because cartridge housing 146 is comprised of an increased elasticity polyolefin polymer having an increased ultimate elongation percentage, the integrity of filter cartridge 144 is maintained. In addition, the strength of rigid cartridge head 148 prevents rigid cartridge head 148 from stretching, expanding or deforming. By maintaining its physical shape, rigid cartridge head 148 remains attached to the manifold and eliminates any possible leaking that could occur through warping and disengaging from the manifold.

When filter cartridge 184 is exposed to expansion stress, elastic cartridge housing 186 begins to stretch, expand and deform rather than bursting and suffering a failure such as fracture 114. Because cartridge housing 186 is comprised of an increased elasticity polyolefin polymer having an increased ultimate elongation percentage, the integrity of filter cartridge 184 is maintained. In addition, the strength of rigid cartridge head 188 prevents rigid cartridge head 188 from stretching, expanding or deforming. By maintaining its physical shape, rigid cartridge head 188 remains attached to the manifold and eliminates any possible leaking that could occur through warping and disengaging from the manifold.

Prior to installation of filter cartridge 226, compression sleeve 230 is subject only to atmospheric pressure. Once filter cartridge 226 is installed, compression sleeve 230 is exposed to line pressure resulting in compression of compression sleeve 230 to a first compression. When exposed to freezing conditions, ice created expansion stress will expand against compression sleeve 230, compressing air pockets 248 to a second compression. This expansion serves to compress air pockets 248 so that cartridge housing 228 does not experience all of the resulting expansion forces. Because compression sleeve 230 compresses as the ice expands, cartridge housing 228 does not experience the full expansion force, which may be in excess of the burst pressure. The physical characteristics of compression sleeve 230 including thickness and volume of trapped air can be altered so as to allow adjustments to the wall thickness, geometry or polymer composition of cartridge housing 228.

When filter cartridge 268 is exposed to freezing conditions, the volume of water present in cartridge housing 270 is preferably low enough that the expansion stress of the ice does not result in excessive stretching, expansion and deformation of the filter cartridge 268. By using a filter element 272 having a reduced capacity for entraining water, less water is available to freeze. In addition, the wall thickness 282 is high enough to resist any expansion stress caused by the available water turning to ice.

While the advantages of the various embodiments of the present invention have been disclosed, it will be obvious to one skilled in the art that these embodiments are readily combinable and numerous freeze resistant embodiments are achievable.

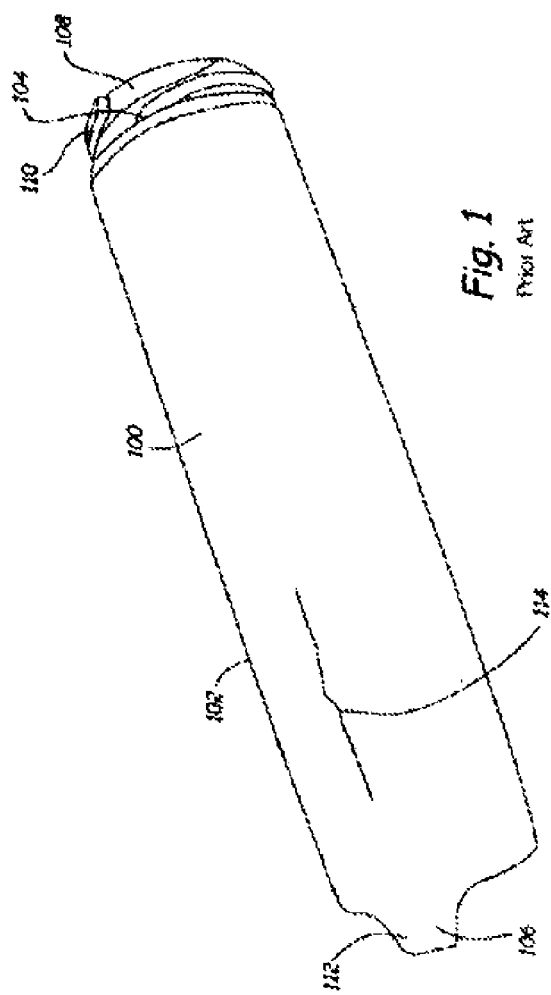

I claim:

1. A filter cartridge comprising:
   an elastic cartridge housing;
   a filter element located within the elastic cartridge housing;
     a rigid cartridge head permanently attached to one end of the elastic cartridge housing and comprising a connection member configured to prevent the filter cartridge from disengaging from a filter manifold; and
     an open volume within the filter cartridge to be filled with water at line pressure;
   the elastic cartridge housing comprising a first material that will begin to deform as the water freezes, and will deform and expand radially outwardly, but not rupture, during a freezing event of the water filling said open volume, the integrity of the first material being maintained after the freezing event, said elastic cartridge housing not enclosed by any other member;
   the rigid cartridge head comprising a second material that will maintain its physical shape at line pressure and during the freezing event; wherein the rigid cartridge head remains affixed to the elastic cartridge housing after the freezing event.

2. The filter cartridge of claim 1
   wherein the elastic cartridge housing comprises a wall having a wall thickness defined by an inner wall surface and an exterior wall surface, wherein the wall thickness is in a range from about one-eighth inch to about one-half inch.

3. The filter cartridge of claim 1, wherein the first material is one of low density polyethylene or high density polyethylene, including combinations thereof.

4. The filter cartridge of claim 1, wherein the second material is polypropylene.

5. The filter cartridge of claim 1, wherein the first material has an ultimate elongation of at least about 100 percent and the second material has an ultimate elongation of about 30 percent or lower.

6. The filter cartridge of claim 1, wherein the filter element is adapted for water filtration means selected from the group consisting of: depth filtration, absolute filtration, activated carbon filtration, ion-exchange filtration, and combinations thereof.

7. The filter cartridge of claim 1
   wherein the filter element is configured with a reduced porosity to limit the open volume to a volume less than that which, when filled with water and frozen, is necessary to maintain the integrity of the first material after a freezing event.

8. The filter cartridge of claim 7 wherein the first material has an ultimate elongation of at least about 100 percent and the second material has an ultimate elongation of about 30 percent or lower.

9. The filter cartridge of claim 1, wherein the permanent attachment comprises a weld ring.

10. The filter cartridge of claim 9, wherein the weld ring is permanently bonded to the elastic cartridge housing by bonding means selected from the group consisting of: spin welding, hot plate, electromagnetic radiation heating, sonic welding, adhesive bonding, laser welding, and combinations thereof.

11. The filter cartridge of claim 1, wherein the first material is one of mettalocene modified polypropylene or metallocene modified polyethylene, including combinations thereof.

12. The filter cartridge of claim 11, wherein the second material is polypropylene.

* * * * *

UNITED STATES PATENT AND TRADEMARK OFFICE
CERTIFICATE OF CORRECTION

Page 1 of 2

PATENT NO.        : 7,708,148 B2
APPLICATION NO.   : 11/758841
DATED             : May 4, 2010
INVENTOR(S)       : Karl Fritze It is certified that error appears in the above-identified patent and that said Letters Patent is hereby corrected as shown below:

In the Drawings

Drawing Sheet 1 of 14, replace Fig. 1 with the following figure on the attached page.

In the Specification

Column 10, line 40, "mettalocene" should be -- metallocene --.

Signed and Sealed this
Second Day of December, 2014

Michelle K. Lee
*Deputy Director of the United States Patent and Trademark Office*